United States Patent [19]

Dyer et al.

[11] Patent Number: 5,547,212
[45] Date of Patent: Aug. 20, 1996

[54] PASSENGER SIDE AIRBAG INFLATOR WITH FLANGED MOUNTING ADAPTER

[75] Inventors: David J. Dyer, Kaysville; Brian D. Gunn, Ogden, both of Utah

[73] Assignee: Morton International, Inc., Chicago, Ill.

[21] Appl. No.: 517,798

[22] Filed: Aug. 22, 1995

[51] Int. Cl.$^6$ .................................................. B60R 21/16
[52] U.S. Cl. ........................................ 280/728.2; 780/732
[58] Field of Search ................................. 280/728.2, 732, 280/741

[56] References Cited

U.S. PATENT DOCUMENTS

| | | | |
|---|---|---|---|
| 4,153,273 | 8/1979 | Risko | 280/728.2 |
| 5,257,815 | 11/1993 | Bachelder et al. | 280/728.2 |
| 5,342,084 | 8/1994 | Rose et al. | 280/728.2 |
| 5,356,175 | 10/1994 | Rose et al. | 280/728.2 |
| 5,445,408 | 8/1995 | Mossi | 280/728.2 |
| 5,449,195 | 9/1995 | Garner | 280/728.2 |
| 5,458,362 | 10/1995 | Buchanan et al. | 280/728.2 |

*Primary Examiner*—Kenneth R. Rice
*Attorney, Agent, or Firm*—George W. Rauchfuss, Jr.; Gerald K. White

[57] ABSTRACT

An inflator for use in an airbag module assembly including a reaction canister having a stud-receiving opening in a front canister endplate and an inflator-receiving aperture in a rear canister endplate. The inflator includes an inflator housing and a mounting adapter, the inflator housing having a generally cylindrical sidewall, a front housing end with a mounting stud extending therefrom, and a rear housing end including an endwall and a boss, the boss extending rearwardly from the endwall. The mounting adapter includes an adapter end cap defining an opening. The adapter end cap is positioned adjacent the endwall of the inflator housing with the boss extending through the opening. The mounting adapter is secured to the housing by a mechanical interengagement between the adapter end cap and the rear housing end. The mounting adapter is adapted to extend through the inflator-receiving aperture of the rear canister endplate and has a radially extending flange adapted to engage the rear canister endplate surrounding the inflator-receiving aperture. The mounting stud is adapted to fit within the stud-receiving opening of the front canister endplate to be secured thereto so that the mounting stud and the adapter, in combination, secure the inflator within the reaction canister and allow the inflator to withstand substantial tensional loading between the canister endplates.

20 Claims, 4 Drawing Sheets

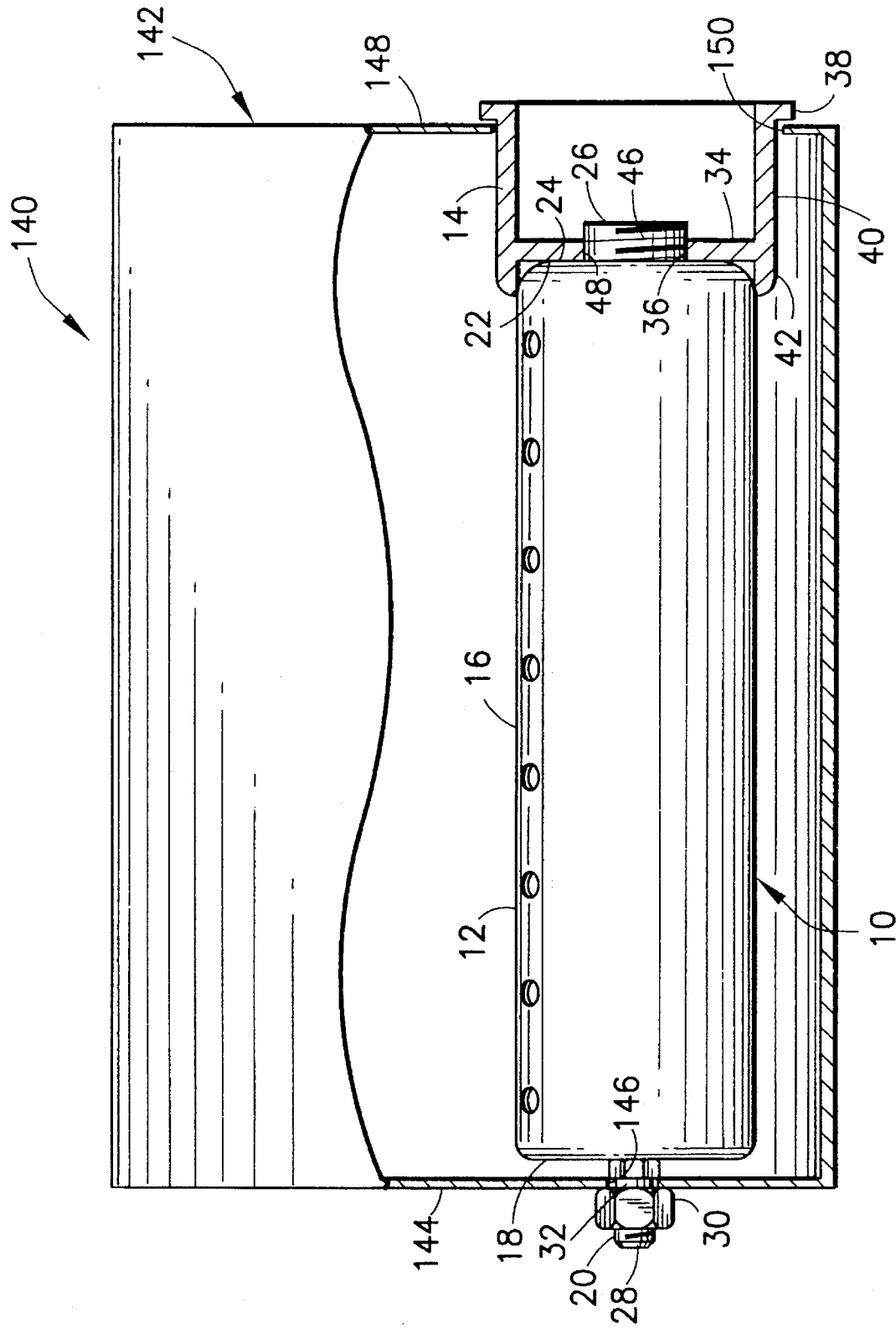

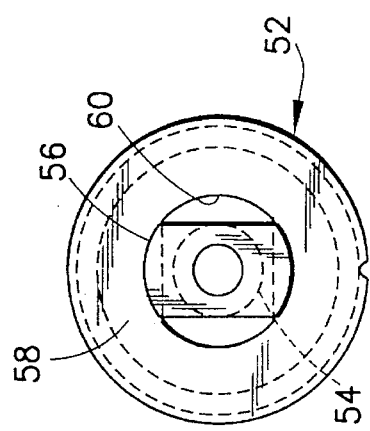
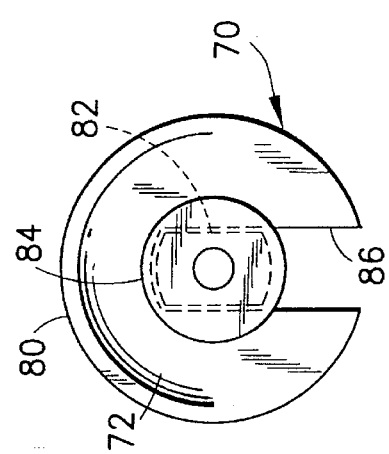
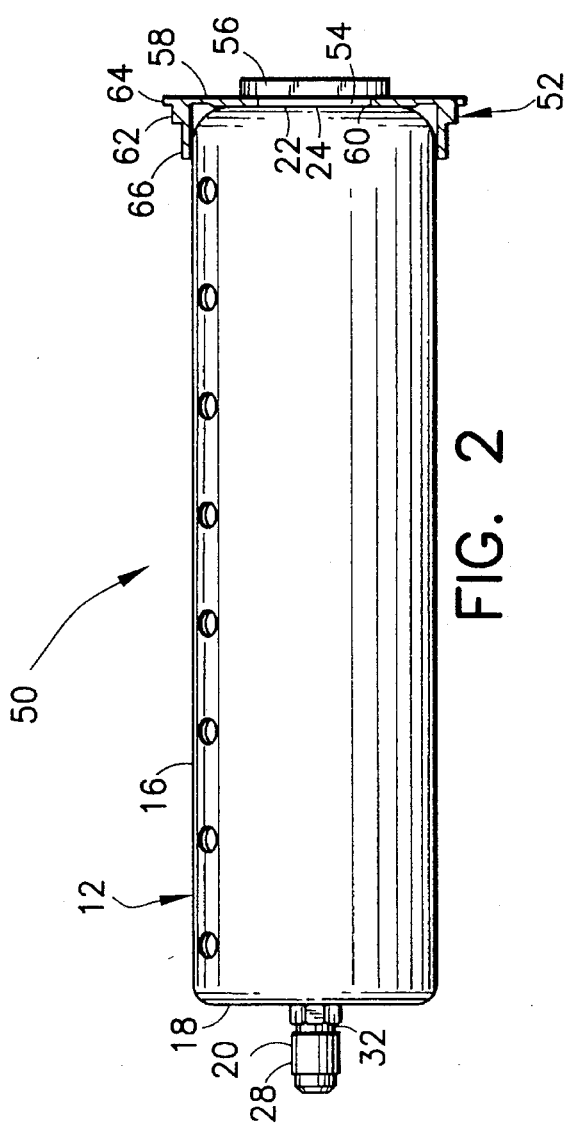
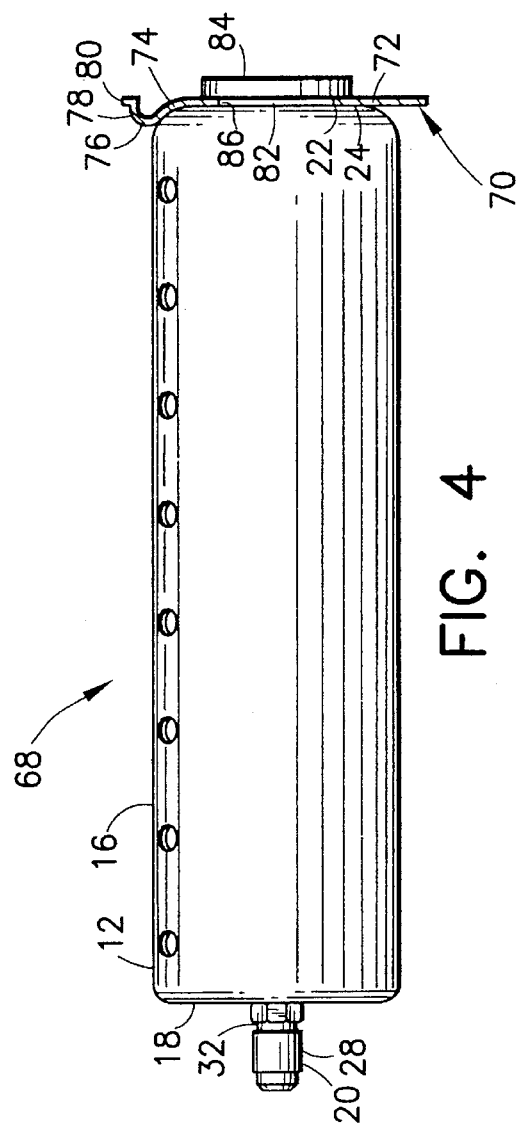

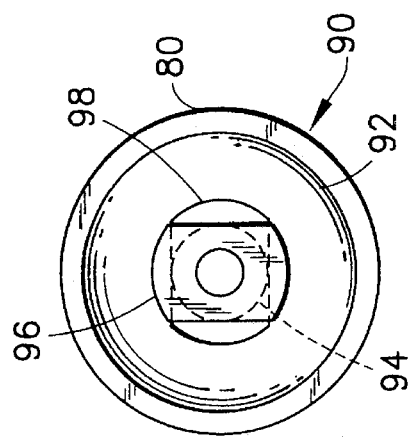
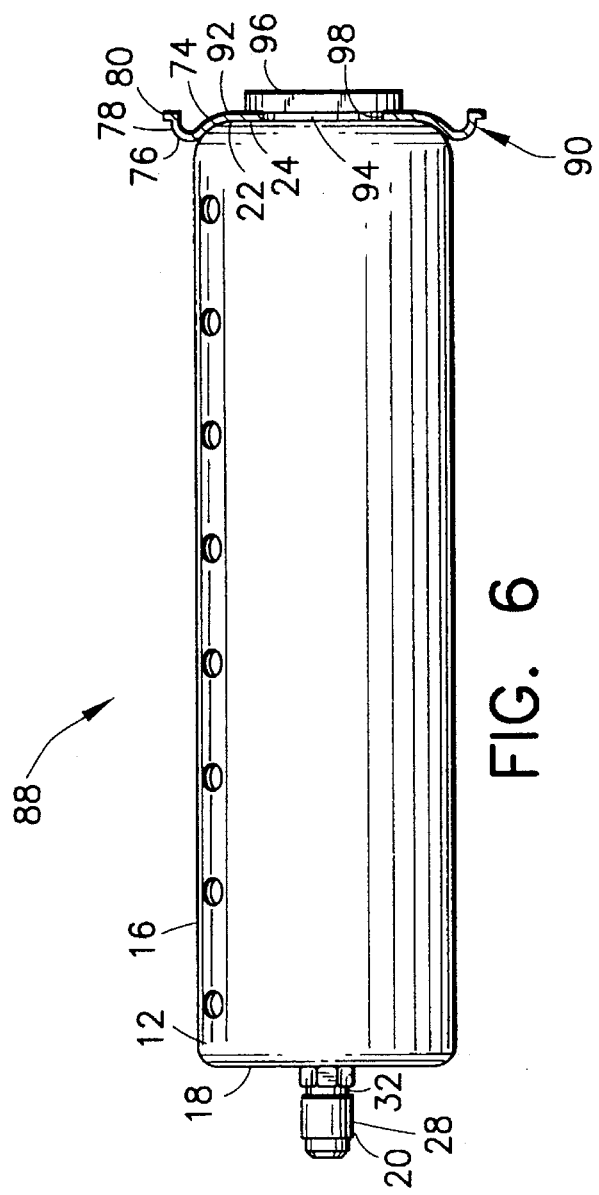

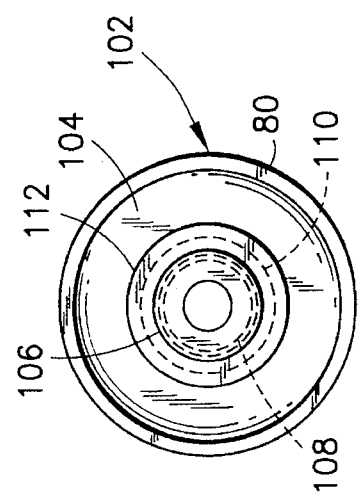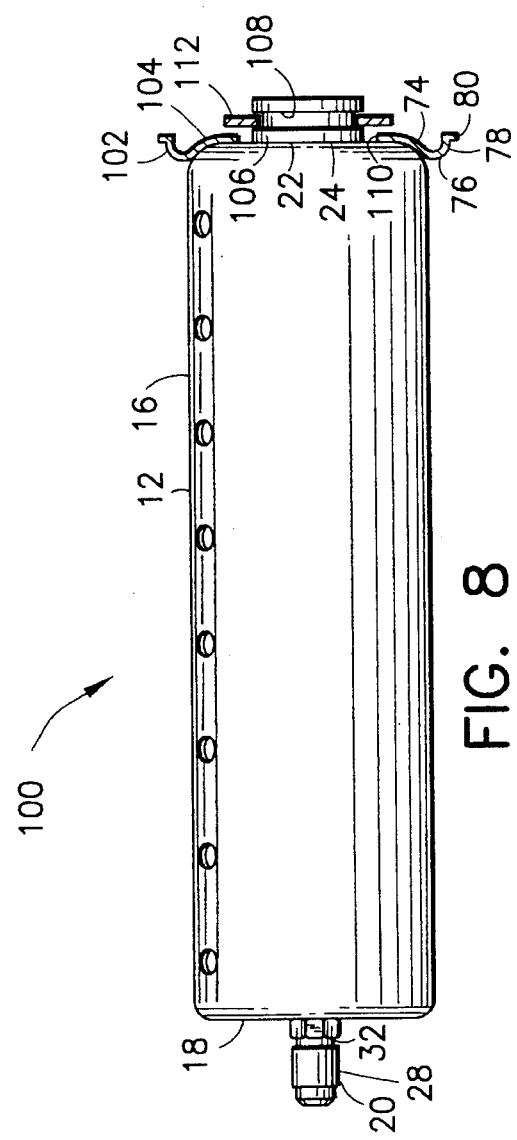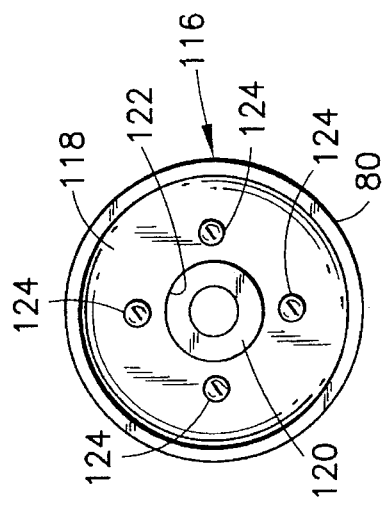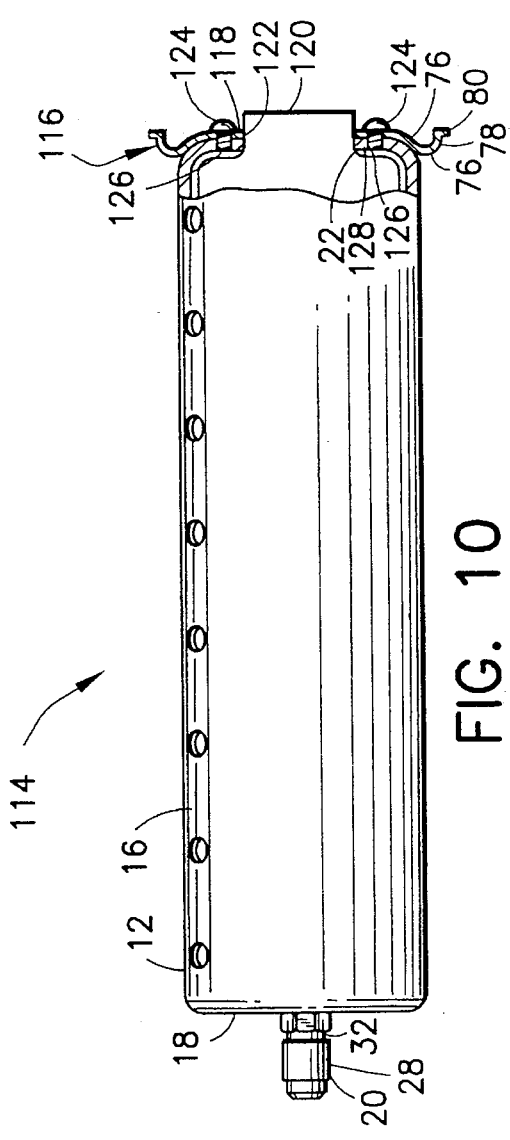

PASSENGER SIDE AIRBAG INFLATOR WITH FLANGED MOUNTING ADAPTER

FIELD OF THE INVENTION

The present invention relates to an inflator for an airbag module assembly. More particularly, the present invention relates to a passenger side inflator having a flanged mounting adapter.

BACKGROUND OF THE INVENTION

Providing a flanged mounting adapter for securely mounting inflators within existing reaction canisters of airbag module assemblies so that the inflator can withstand a substantial tensional load would be useful. Also, adapting different sizes of inflators for mounting in existing reaction canisters would be helpful.

Airbag module assemblies are part of inflatable restraint systems that are employed in automobiles for protecting an occupant against injury by physically restraining the occupant's body when the automobile encounters a collision. The passenger side airbag module assembly normally includes a reaction canister housing an airbag cushion and an inflator which is mounted between two endplates of the canister. The inflator, once triggered by a remote collision sensor, provides the inflation gas for inflating the airbag cushion. The airbag cushion has an open mouth positioned to receive the inflation gas.

The inflator is preferably constructed and mounted so that it can withstand a substantial tensional load to assist in holding the canister endplates of the reaction canister during inflation of the airbag cushion. It has been determined that to protect an occupant during a collision, the airbag cushion should inflate within 20 to 40 milliseconds after the initial impact. The inflation gas supplied to the airbag cushion, necessarily under high pressure to inflate the airbag within that short time, produces forces which tend to push the endplates of the reaction canister outward. Because of these expansive forces, an inflator should be mounted so that the inflator will be able to withstand a substantial tensional load to assist in keeping the canister endplates attached to the reaction canister during inflation of the airbag cushion. As with all components used in automobiles, the inflator should also be mounted in a squeak and rattle-free manner.

Many prior art inflators have a mounting flange welded to or integral with one end thereof, and a stud extending from the other end. The flange engages one canister endplate of the reaction canister while the stud extends through the other canister endplate and is secured thereto. Although this type of inflator provides squeak and rattle-free mounting that can withstand a substantial tensional load, it is sometimes difficult and costly to fabricate a flange as part of the inflators and the inflators are not easily adapted to different sizes of canisters.

One prior art mounting adapter, shown and described in U.S. Pat. No. 5,342,084 mounts and adapts an inflator having an integral flange for use in a reaction canister that is longer than the inflator. Although this adapter performs well and provides excellent strength, the adapter partly relies upon a frictional engagement with the inflator and therefore may become unattached during shipping and handling prior to installation. In addition, this adapter is designed for use with an inflator having an integral flange, when it would be useful to provide an adapter that would accommodate an inflator without an integral flange.

Another prior art mounting adapter, shown and described in U.S. Pat. No. 5,356,175 is designed for use with a flangeless inflator that is shorter than the canister that it is mounted in. Although this adapter also performs well, it relies upon a friction engagement to secure the inflator within the adapter. This adapter therefore does not allow the inflator to withstand a substantial tensional load, and also may become unattached during shipping and handling prior to installation.

Accordingly, providing a flanged mounting adapter for securely mounting different sizes of inflators within existing reaction canisters of airbag module assemblies so that a substantial tensional load may be applied to the inflator would be useful. It would also be useful if the mounting adapter provided squeak and rattle-free mounting and remained attached to the inflator during shipping and handling of the inflator prior to installation in a reaction canister of an airbag module assembly.

SUMMARY OF THE INVENTION

An object, therefore, of the present invention is to provide a flanged mounting adapter for securely mounting an inflator within a reaction canister of an airbag module assembly.

Another object of the present invention is to provide a flanged mounting adapter for an inflator that allows the inflator to withstand a substantial tensional load between the canister endplates of a reaction canister.

An additional object of the present invention is to provide a flanged mounting adapter for an inflator that allows the use of different sizes of inflators with existing reaction canisters.

A further object of the present invention is to provide a flanged mounting adapter for an inflator that will stay attached to the inflator during shipping and handling of the inflator prior to installation in a reaction canister of an airbag module assembly.

Yet another object of the present invention is to provide a flanged mounting adapter for an inflator that will provide squeak and rattle-free mounting of the inflator within a reaction canister of an airbag module assembly.

In carrying out this invention, there is provided an inflator for use in an airbag module assembly including a reaction canister having a front canister endplate and a rear canister endplate forming an inflator-receiving aperture. The inflator includes an inflator housing and a mounting adapter.

The inflator housing has a generally cylindrical sidewall, a front housing end with means for mounting the front housing end to the front canister endplate, and a rear housing end forming an endwall and a boss, the boss extending rearwardly from the endwall.

The mounting adapter includes an adapter end cap defining an opening. The adapter end cap is positioned adjacent the endwall of the inflator housing with the boss extending through the opening, and is mechanically interengaged with the rear housing end of the inflator housing to secure the mounting adapter to the inflator housing. The mounting adapter also has a peripheral flange that extends radially outwardly from the adapter end cap and inflator sidewall. The flange is adapted to engage the rear canister endplate surrounding the inflator-receiving aperture. The mounting adapter and means for securing the front housing end to the front canister endplate, in combination, secure the inflator within the reaction canister and allow the inflator to withstand a substantial tensional load between the canister endplates.

According to one aspect of the present invention, the mounting adapter further includes a cylindrical sleeve extending from the adapter end cap with the peripheral flange extending radially outwardly from the sleeve. The sleeve is adapted to fit through the inflator-receiving aperture of the rear canister endplate with the peripheral flange engaged against the rear canister endplate. The length of the sleeve is selected such that the mounting adapter can extend between the inflator housing and the rear endplate of a canister that is of a different length than the inflator housing.

According to another aspect of the present invention, the adapter further includes a cylindrical stabilizer extending forwardly from the sleeve over a portion of the cylindrical sidewall adjacent the rear housing end. The stabilizer engages the sidewall to provide additional stability to the mechanical interengagement between the adapter end cap and the rear housing end.

According to a further aspect of the present invention, the boss is generally cylindrical and has a threaded outer surface. The opening in the end cap comprises a generally circular threaded aperture that mates with the threaded outer surface of the boss. The boss and the threaded aperture, therefore, provide the mechanical interengagement between the adapter end cap and the rear housing end.

According to yet another aspect of the present invention, the boss is generally circular and has an overhanging, generally oblate head, and the opening in the adapter end cap comprises a generally oblate aperture. The oblate aperture fits around the circular boss in a first relative orientation of the aperture and the head, and engages under the oblate head in a different relative orientation of the aperture and the head, to provide the mechanical interengagement between the adapter end cap and the rear housing end.

According to a still further aspect of the present invention, the cylindrical sidewall of the inflator housing curves inwardly to meet the endwall of the rear housing end. In place of the cylindrical stabilizer, the adapter end cap includes a conforming periphery that conforms to the curved joinder of the inflator sidewall and endwall to provide additional stability to the mechanical interengagement between the adapter end cap and the rear housing end. A u-shaped transition extends from the conforming periphery to the cylindrical sleeve.

According to another aspect of the present invention, the boss is generally oblate and has an overhanging head, and the opening in the adapter end cap comprises a generally oblate slot that extends to an outer edge of the end cap. The oblate slot fits around the oblate boss and engages under the overhanging head to provide the mechanical interengagement between the adapter end cap and the rear housing end.

According to an additional aspect of the present invention, the boss is generally circular and has an overhanging, generally oblate head, and the opening in the adapter end cap comprises a generally oblate aperture. The oblate aperture fits around the circular boss in a first relative orientation of the aperture and the head, and engages under the oblate head in a different relative orientation of the aperture and the head, to provide the mechanical interengagement between the adapter end cap and the rear housing end.

According to a further aspect of the present invention, the boss is generally circular and has a radial groove thereon, and the opening in the adapter end cap comprises a generally circular aperture that fits around the boss and under the groove. The adapter further includes a split ring positioned within the groove and over at least a portion of the adapter end cap surrounding the aperture to provide the mechanical interengagement between the adapter end cap and the rear housing end.

According to yet another aspect of the present invention, the mounting adapter further includes a plurality of spaced-apart screws mechanically interengaged respectively in a plurality of threaded receiving holes in the endwall of the inflator housing to provide the mechanical interengagement between the adapter end cap and the rear housing end.

In summary, the present invention provides an inflator having a flanged mounting adapter that securely mounts a flangeless housing of the inflator within a reaction canister of an airbag module assembly. The mounting adapter allows the inflator to withstand a substantial tensional load between the canister endplates of the reaction canister, and provides squeak and rattle-free mounting of the inflator. In addition, the mounting adapter remains attached to the inflator during shipping and handling of the inflator prior to installation in the reaction canister, and allows different sizes of inflators to be mounted in existing reaction canisters.

The invention together with further objects, features, advantages and aspects thereof, will be more clearly understood from the following description taken in connection with the accompanying drawings.

BRIEF DESCRIPTION OF THE DRAWINGS

FIG. 1 is a side elevation view, partially in section, of an inflator with a mounting adapter secured in a reaction canister, according to the present invention;

FIG. 2 is a side elevation view, partially in section, of another inflator with a mounting adapter, according to the present invention;

FIG. 3 is a rear elevation view of the inflator of FIG. 2;

FIG. 4 is a side elevation view, partially in section, of an additional inflator with a mounting adapter, according to the present invention;

FIG. 5 is a rear elevation view of the inflator of FIG. 4;

FIG. 6 is a side elevation view, partially in section, of yet another inflator with a mounting adapter, according to the present invention;

FIG. 7 is a rear elevation view of the inflator of FIG. 6;

FIG. 8 is a side elevation view, partially in section, of a further inflator with a mounting adapter, according to the present invention;

FIG. 9 is a rear elevation view of the inflator of FIG. 8;

FIG. 10 is a side elevation view, partially in section, of a still further inflator with a mounting adapter, according to the present invention; and FIG. 11 is a rear elevation view of the inflator of FIG. 10.

The same reference numerals refer to the same elements throughout the various figures.

DETAILED DESCRIPTION OF THE INVENTION

Referring first to FIG. 1, the present invention is directed to an inflator, generally represented by the reference numeral 10, for use in an airbag module assembly, generally represented by the reference numeral 140, also including a reaction canister 142 having a stud-receiving opening 146 in a front canister endplate 144 and an inflator-receiving aperture 150 in a rear canister endplate 148.

The airbag module assembly 140 also includes other components; however, these other components and how they work are known in the art and, accordingly, are not described in detail as they do not in themselves constitute features of the present system. Only the parts of a reaction canister 142 relating to the inflator 10 according to the present invention will be described in detail. In addition, only external portions of the inflator 10 relating to the present invention will be described in detail.

The inflator 10 includes an inflator housing 12 and a mounting adapter 14. The inflator housing 12 has a generally cylindrical sidewall 16, a front housing end 18 with means 20 for mounting the front housing end 18 to the front canister endplate 144, and a rear housing end 22 forming an endwall 24 and a boss 26. The boss 26 extends rearwardly from the endwall 24 and normally contains a receptacle for receiving a connector from a remote collision sensor. As shown, the cylindrical sidewall 16 of the inflator housing 12 curves inwardly to meet the endwall 24 of the rear housing end 22.

A mounting stud 28 comprises the means 20 for mounting the front housing end 18 to the front canister endplate 144. The mounting stud 28 is adapted to fit through the stud-receiving opening 146 of the front canister endplate 144 and is secured thereto by a nut 30 or the like. The stud 28 includes a keyed base 32 and the stud-receiving opening 146 is also keyed to correctly orient the inflator 10 within the canister 142.

The mounting adapter 14 includes a circular adapter end cap 34 defining a central opening 36. The adapter end cap 34 is positioned adjacent the endwall 24 of the inflator housing 12 with the boss 26 extending through the opening 36, and is mechanically interengaged with the rear housing end 22 of the inflator housing 12 to secure the mounting adapter 14 to the inflator housing 12. On the inflator 10 according to the present invention shown in FIG. 1, the boss 26 is generally cylindrical and has a threaded outer surface 46. The opening 36 in the end cap 34 comprises a generally circular threaded aperture 48 that mates with the threaded outer surface 46 of the boss 26 to provide the mechanical interengagement between the adapter end cap 34 and the rear housing end 22.

The mounting adapter 14 further includes a cylindrical sleeve 40, a peripheral flange 38 and a cylindrical stabilizer 42. The sleeve 40 extends from the adapter end cap 34 with the peripheral flange 38 extending radially outward from the sleeve 40 at the end thereof. The sleeve 40 is adapted to fit through the inflator-receiving aperture 150 of the rear canister endplate 148 with the peripheral flange 38 engaged against the rear canister endplate 148. The stabilizer 42 extends forwardly from the sleeve 40 over a portion of the cylindrical sidewall 16 adjacent the rear housing end 22. The stabilizer 42 engages the sidewall 16 to provide additional stability to the mechanical interengagement between the adapter end cap 34 and the rear housing end 22.

During assembly the mounting adapter 14 is screwed onto the inflator housing 12 prior to installation of the inflator 10 in the reaction canister 142. The inflator 10 is inserted through inflator receiving opening 150, so that flange 38 engages canister endplate 148 and stud 28 extends through stud receiving opening 146. Nut 30 on the mounting stud 28 and the mounting adapter 14, in combination, secure the inflator 10 within the reaction canister 142 and allow the inflator 10 to withstand a substantial tensional load between the endplates 144,148 of the reaction canister 142.

The sleeve 40, in addition to supporting the flange 38, adapts the mounting adapter 14 to extend between the inflator housing 12 and the rear endplate 148 of a reaction canister 142 that is of a different length than the inflator housing 12. Although best seen on the inflator according to the present invention shown in FIG. 1, the sleeves of each of the other inflators according to the present invention, shown in FIGS. 2 through 11 and described below, could be longer than illustrated to adapt the inflator for use with a longer reaction canister, and all of the adapters function to size the inflator to a reaction canister.

Referring to FIGS. 2 and 3, another inflator 50 with mounting adapter 52, according to the present invention is shown. The inflator 50 has a boss 54 that is generally circular and has an overhanging, generally oblate head 56. The mounting adapter has an adapter end cap 58 with a central opening comprising a generally oblate aperture 60. The oblate aperture 60 fits around the oblate head 56 in a first relative orientation of the aperture 60 and the head 56 and, as shown in FIGS. 2 and 3, engages under the oblate head 56 in a different relative orientation of the aperture 60 and the head 56, to provide the mechanical interengagement between the adapter end cap 58 and the rear housing end 22. During assembly the mounting adapter 52 is placed on the rear housing end 22 and twisted to secure the adapter end cap 58 under the oblate head 56.

The mounting adapter 50 further includes a cylindrical sleeve 62 extending from the adapter end cap 58 with a peripheral flange 64 extending radially outward from the sleeve 62 at the end thereof. A stabilizer 66 extends forwardly from the sleeve 62 over a portion of the cylindrical sidewall 16 adjacent the rear housing end 22 to provide additional stability to the mechanical interengagement between the adapter end cap 58 and the rear housing end 22. The inflator has a mounting stud 28 that in combination with the mounting adapter 52 secure the inflator 50 within the reaction canister 142 and allow the inflator 50 to withstand a substantial tensional load between the canister endplates 144,148.

Referring to FIGS. 4 and 5, an additional inflator 68 with mounting adapter 70, according to the present invention is shown. In place of the cylindrical stabilizer 42 or 66 of FIGS. 1–3, the mounting adapter has an adapter end cap 72 that includes a conforming periphery 74 that conforms to the curved joinder of the inflator sidewall 16 and endwall 24 to provide additional stability to the mechanical interengagement between the adapter end cap 72 and the rear housing end 22. A u-shaped transition 76 extends from the conforming periphery 74 to a cylindrical sleeve 78 having a peripheral flange 80 extending therefrom. Alternatively, the inflator, as well as the inflators shown in FIGS. 6–11 discussed below, could have the stabilizer 42 or 66 of FIGS. 1–3, and the inflators of FIGS. 1–3 could alternatively have the conforming periphery 60 and u-shaped transition 62 of FIGS. 4–11.

The inflator 68 has a boss 82 that is generally oblate and has an overhanging, generally circular head 84, and the adapter end cap 72 has an opening defining a generally oblate slot 86 that extends to an outer edge of the end cap 72. The oblate slot 86 fits around the oblate boss 82 with a portion of the adapter end cap 72 received under the circular head 84 to provide the mechanical interengagement between the adapter end cap 72 and the rear housing end 22 of the inflator housing 12. During assembly the mounting adapter 70 is slid onto the boss 82 and secured under the head 84. The inflator has a mounting stud 28 that in combination with the mounting adapter 70 secure the inflator 68 within the reaction canister 142 and allow the inflator 68 to withstand a substantial tensional load between the canister endplates 144,148.

Referring to FIGS. 6 and 7, a further inflator 88 with mounting adapter 90 according to the present invention is shown. The mounting adapter 90 has an adapter end cap 92 that includes a conforming periphery 74 that conforms to the curved joinder of the inflator sidewall 16 and endwall 24. A u-shaped transition 76 extends from the conforming periphery 74 to a cylindrical sleeve 78 having a peripheral flange 80 extending therefrom. The inflator 88 has a boss 94 that is generally circular and has an overhanging, generally oblate head 96, and the adapter end cap 92 has an opening defining a generally oblate aperture 98. The oblate aperture 98 fits around the oblate head 96 in a first relative orientation of the aperture 98 and the head 96 and, as shown in FIGS. 6 and 7, engages under the head 96 in a different relative orientation of the aperture 98 and the head 96, to provide the mechanical interengagement between the adapter end cap 92 and the rear housing end 22. During assembly, the mounting adapter 90 is placed onto the rear housing end 22 and twisted to secure the adapter end cap 92 under the oblate head 96. The inflator has a mounting stud 28 that in combination with the mounting adapter 90 secure the inflator 88 within the reaction canister 142 and allow the inflator 88 to withstand a substantial tensional load between the canister endplates 144,148.

Referring to FIGS. 8 and 9, a still further inflator 100 with mounting adapter 102 according to the present invention is shown. The mounting adapter 102 has an adapter end cap 104 that includes a conforming periphery 74 that conforms to the curved joinder of the inflator sidewall 16 and endwall 24. A u-shaped transition 76 extends from the conforming periphery 74 to a cylindrical sleeve 78 having a peripheral flange 80 extending therefrom. The inflator 100 has a boss 106 that is generally circular and has a radial groove 108. The adapter end cap 104 has an opening defining a generally circular aperture 110 that fits around the boss 106 and under the groove 108. The mounting adapter 102 further includes a split ring 112 positioned within the groove 108 and over at least a portion of the adapter end cap 104 surrounding the aperture 110 to provide the mechanical interengagement between the adapter end cap 104 and the rear housing end 22. The inflator 100 has a mounting stud 28 that in combination with the mounting adapter 102 secure the inflator 100 within the reaction canister 142 and allow the inflator 100 to withstand a substantial tensional load between the canister endplates 144,148.

Referring to FIGS. 10 and 11, yet another inflator 114 with mounting adapter 116 according to the present invention is shown. The mounting adapter 116 has an adapter end cap 118 that includes a conforming periphery 74 that conforms to the curved joinder of the inflator sidewall 16 and endwall 24. A u-shaped transition 76 extends from the conforming periphery 74 to a cylindrical sleeve 76 having a peripheral flange 78 extending therefrom. The inflator 114 has a boss 120 that fits through an opening 122 in the adapter end cap 118. The adapter end cap further includes a plurality of spaced-apart screws mechanically interengaged respectively in a plurality of threaded receiving holes 126 in an endwall 126 of the inflator housing 12 to provide the mechanical interengagement between the adapter end cap 118 and the rear housing end 22. The inflator 114 has a mounting stud 28 that in combination with the mounting adapter 116 secure the inflator 114 within the reaction canister 142 and allow the inflator 114 to withstand a substantial tensional load between the canister endplates 144,148.

In summary, the present invention provides inflators having flanged mounting adapters that securely mount the inflators within the reaction canister of an airbag module assembly. The mounting adapters allow the inflators to withstand a substantial tensional load between the canister endplates and provide squeak and rattle-free mounting of the inflators. In addition, the mounting adapters stay attached to their respective inflators during shipping and handling of the inflators prior to installation in the reaction canister, and allow shorter inflators to be mounted in existing reaction canisters.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An inflator for use in an airbag module assembly including a reaction canister having a front canister endplate and a rear canister endplate defining an inflator-receiving aperture, the inflator comprising:

an inflator housing having a cylindrical sidewall, a front housing end having means for securing the front housing end to the front canister endplate, and a rear housing end forming an endwall and a boss, the boss extending rearwardly from the endwall;

a mounting adapter including an adapter end cap defining an opening, the adapter end cap positioned adjacent the endwall of the inflator housing with the boss extending through the opening, the adapter end cap mechanically interengaged with the rear housing end of the inflator housing to secure the mounting adapter to the inflator housing, the mounting adapter further having a peripheral flange extending radially outward from the adapter end cap and housing sidewall and sized and adapted to engage the rear canister endplate surrounding the inflator-receiving aperture;

whereby the mounting adapter and means for securing the front housing end to the front canister endplate, in combination, secure the inflator within the reaction canister and allow the inflator to withstand substantial tensional loading between the canister endplates.

2. The inflator of claim 1 wherein the mounting adapter further includes a cylindrical sleeve extending from the adapter end cap, the peripheral flange extending radially outward from the sleeve, the sleeve adapted to fit through the inflator-receiving aperture of the rear canister endplate with the peripheral flange engaged against the rear canister endplate.

3. The inflator of claim 2 for use with a reaction canister that is longer than the inflator housing wherein the cylindrical sleeve extending between the adapter end cap and the peripheral flange is sized to provide an inflator of appropriate length for connecting the endplates of the reaction canister.

4. The inflator of claim 2 wherein the adapter further includes a cylindrical stabilizer extending forwardly from the sleeve over a portion of the cylindrical sidewall adjacent the rear housing end, whereby the stabilizer engages the sidewall to provide additional stability to the mechanical interengagement between the adapter end cap and the rear housing end.

5. The inflator of claim 2 wherein the cylindrical sidewall of the inflator housing curves inwardly to meet the endwall of the rear housing end, the adapter end cap includes a conforming periphery that conforms to the curved joinder of the sidewall and endwall to provide additional stability to the mechanical interengagement between the adapter end cap and the rear housing end, and a u-shaped transition extends from the conforming periphery to the cylindrical sleeve.

6. The inflator of claim 1 wherein the adapter further includes a cylindrical stabilizer extending forwardly from the adapter end cap over a portion of the cylindrical sidewall adjacent the rear housing end, whereby the stabilizer engages the sidewall to provide additional stability to the mechanical interengagement between the adapter end cap and the rear housing end.

7. The inflator of claim 1 wherein the boss is generally cylindrical and has a threaded outer surface, the opening in the end cap comprises a generally circular threaded aperture mated with the threaded outer surface of the boss to provide the mechanical interengagement between the adapter end cap and the rear housing end.

8. The inflator of claim 7 wherein the adapter further includes a cylindrical sleeve extending rearwardly from the adapter end cap, the peripheral flange extending radially outward from the sleeve, the sleeve adapted to fit through the inflator-receiving aperture of the rear canister endplate with the peripheral flange engaged against the rear canister endplate, and a cylindrical stabilizer extending forward from the sleeve over a portion of the cylindrical sidewall adjacent the rear housing end and engaging the sidewall to provide additional stability to the mechanical interengagement between the adapter end cap and the rear housing end.

9. The inflator of claim 1 wherein the boss is generally oblate and has an overhanging, generally circular head, the opening in the adapter end cap comprises a generally oblate slot extending to an outer edge of the end cap, the oblate slot fitting around the oblate boss with a portion of the adaptor end cap positioned under the circular head to provide the mechanical interengagement between the adapter end cap and the rear housing end.

10. The inflator of claim 9 wherein the mounting adapter further includes a cylindrical sleeve extending from the adapter end cap, the peripheral flange extending radially outward from the sleeve, the sleeve adapted to fit through the inflator-receiving aperture of the rear canister endplate with the peripheral flange engaged against the rear canister endplate, the cylindrical sidewall of the inflator housing curves inwardly to meet the endwall of the rear housing end, the adapter end cap includes a conforming periphery opposite the oblate slot that conforms to the curved joinder of the sidewall and endwall to provide additional stability to the mechanical interengagement between the adapter end cap and the rear housing end, and a u-shaped transition extending from the conforming periphery to the cylindrical sleeve.

11. The inflator of claim 1 wherein the boss is generally circular and has an overhanging generally oblate head, the opening in the adapter end cap comprises a generally oblate aperture, the oblate aperture fitting around the circular boss in a first relative orientation of the aperture and the oblate head, and engaged under the oblate head in a different relative orientation of the aperture and the oblate head, to provide the mechanical interengagement between the adapter end cap and the rear housing end.

12. The inflator of claim 11 wherein the mounting adapter further includes a cylindrical sleeve extending from the adapter end cap, the peripheral flange extending radially outwardly from the sleeve, the sleeve adapted to fit through the inflator-receiving aperture of the rear canister endplate with the peripheral flange engaged against the rear canister endplate.

13. The inflator of claim 12 wherein the cylindrical sidewall of the inflator housing curves inwardly to meet the endwall of the rear housing end, the adapter end cap includes a conforming periphery that conforms to the curved joinder of the sidewall and endwall to provide additional stability to the mechanical interengagement between the adapter end cap and the rear housing end, and a u-shaped transition extends from the conforming periphery to the cylindrical sleeve.

14. The inflator of claim 12 wherein the adapter further includes a cylindrical stabilizer extending forwardly from the cylindrical sleeve over a portion of the cylindrical sidewall adjacent the rear housing end, whereby the stabilizer engages the sidewall to provide additional stability to the mechanical interengagement between the adapter end cap and the rear housing end.

15. The inflator of claim 1 wherein the boss is generally circular and has a radial groove thereon, the opening in the adapter end cap comprising a generally circular aperture fitting around the boss and under the groove, the adapter further including a split ring positioned within the groove and over at least a portion of the adapter end cap surrounding the aperture to provide the mechanical interengagement between the adapter end cap and the rear housing end.

16. The inflator of claim 15 wherein the mounting adapter further includes a cylindrical sleeve extending from the adapter end cap, the peripheral flange extending radially outwardly from the sleeve, the sleeve adapted to fit through the inflator-receiving aperture of the rear canister endplate with the peripheral flange engaged against the rear canister endplate.

17. The inflator of claim 16 wherein the cylindrical sidewall of the inflator housing curves inwardly to meet the endwall of the rear housing end, the adapter end cap includes a conforming periphery that conforms to the curved joinder of the sidewall and endwall to provide additional stability to the mechanical interengagement between the adapter end cap and the rear housing end, and a u-shaped transition extending from the conforming periphery to the cylindrical sleeve.

18. The inflator of claim 1 wherein the adapter further includes a plurality of spaced-apart screws mechanically interengaged respectively in a plurality of threaded receiving holes in the endwall of the inflator housing to provide the mechanical interengagement between the adapter end cap and the rear housing end.

19. The inflator of claim 18 wherein the mounting adapter further includes a cylindrical sleeve extending from the adapter end cap, the peripheral flange extending radially outward from the sleeve, the sleeve adapted to fit through the inflator-receiving aperture of the rear canister endplate with the peripheral flange engaged against the rear canister endplate.

20. The inflator of claim 19 wherein the cylindrical sidewall of the inflator housing curves inwardly to meet the endwall of the rear housing end, the adapter end cap includes a conforming periphery that conforms to the curved joinder of the sidewall and endwall to provide additional stability to the mechanical interengagement between the adapter end cap and the rear housing end, and a u-shaped transition extending from the conforming periphery to the cylindrical sleeve.

* * * * *

UNITED STATES PATENT AND TRADEMARK OFFICE
CERTIFICATE OF CORRECTION

PATENT NO. : 5,547,212
DATED : 20 August 1996
INVENTOR(S) : David J. Dyer and Brian D. Gunn It is certified that error appears in the above-indentified patent and that said Letters Patent is hereby corrected as shown below:

At column 7, line 54, "screws mechanically" should be --screws 124 mechanically--.

Signed and Sealed this

Eleventh Day of February, 1997

Attest:

BRUCE LEHMAN

Attesting Officer     Commissioner of Patents and Trademarks